United States Patent [19]

Weil et al.

[11] 4,056,052
[45] Nov. 1, 1977

[54] METHOD FOR SHEARING SPENT NUCLEAR FUEL ASSEMBLIES

[75] Inventors: Bradley S. Weil, Oak Ridge; Clyde D. Watson, Knoxville, both of Tenn.

[73] Assignee: The United States of America as represented by the United States Energy Research and Development Administration, Washington, D.C.

[21] Appl. No.: 681,648

[22] Filed: Apr. 29, 1976

[51] Int. Cl.² .............................................. B30B 13/00
[52] U.S. Cl. ........................................ 100/39; 100/95; 100/295; 72/326; 72/334; 83/580; 83/694
[58] Field of Search ............... 100/39, 42, 232, 95–98, 100/295; 72/324, 326, 334, 338; 83/580, 694

[56] References Cited

U.S. PATENT DOCUMENTS

| 665,973 | 1/1901 | Patterson | 100/98 R |
| 2,041,386 | 5/1936 | Laanen, Jr. | 83/580 X |
| 3,593,610 | 7/1971 | Valente | 83/580 |
| 3,763,770 | 10/1973 | Ehrman et al. | 100/39 |
| 3,866,522 | 2/1975 | Oswalt, Jr. | 83/599 |

Primary Examiner—Peter Feldman
Attorney, Agent, or Firm—Dean E. Carlson; Stephen D. Hamel

[57] ABSTRACT

A method is disclosed for shearing spent nuclear fuel assemblies of the type wherein a plurality of long metal tubes packed with ceramic fuel are supported in a spaced apart relationship within an outer metal shell or shroud which provides structural support to the assembly. Spent nuclear fuel assemblies are first compacted in a stepwise manner between specially designed gag-compactors and then sheared into short segments amenable to chemical processing by shear blades contoured to mate with the compacted surface of the fuel assembly.

5 Claims, 20 Drawing Figures

METHOD FOR SHEARING SPENT NUCLEAR FUEL ASSEMBLIES

BACKGROUND OF THE INVENTION

The invention relates generally to the reprocessing of spent nuclear fuel assemblies and, more particularly, to an improved method for shearing spent nuclear fuel assemblies of the type utilizing tubular fuel pins supported within an outer metal shroud. It was made in the course of, or under, a contract with the Energy Research and Development Administration.

Reprocessing of spent fuel assemblies from boiling water reactors (BWR) and pressurized water reactors (PWR) to recover fuel value is accomplished by a process known as the shear-leach process wherein the fuel assemblies are sheared or cut into short segments and the recoverable fissile and fertile materials leached out of the sheared segments with nitric acid. Apparatus to accomplish the shearing part of the shear-leach process is generally known as a fuel bundle shear. Although fuel bundle shears have been successfully developed and routinely used in connection with the reprocessing of BWR and PWR fuel assemblies, fuel assemblies developed for use in the liquid metal fast breeder reactor (LMFBR) present problems in connection with the shearing operation. For example, fuel assemblies used in the LMFBR use a 0.120 inch thick stainless steel shell or shroud to provide a channel for the sodium coolant and to act as a support structure for the fuel pins which are supported therein as compared to the 0.031 inch thick shrouds found in PWR and BWR. In addition, spent LMFBR fuels will display higher radioactivity and decay heat emission that spent fuels from conventional pressurized water and boiling water reactors and will require the highest degree of system reliability throughout the fuel reprocessing operation.

These and other unique problems associated with the fuel assemblies used in LMFBRs require that the product from the shearing mechanism be predictable and uniform, and that the quantities of particle fines be minimized so that subsequent chemical processing proceeds uniformly without the erratic changes in reaction rate associated with large quantities of fines.

Gag compactors designed for compressing and holding BWR and PWR fuel assemblies during shearing are not applicable to the heavily shrouded LMFBR fuel. Such designs are not capable of compressing a LMFBR fuel assembly sufficiently to prevent fuel rods and wire spacers from being pulled out of the assembly during a shearing operation. In addition, existing gag compactors and shearing blades tend to break up the heavy shroud used in LMFBR fuel assemblies, thereby decreasing its ability to contain the fuel pins during subsequent feeding of the fuel assembly to the shear blade.

Known shear blades developed for the special purpose of shearing PWR and BWR fuel assemblies are all essentially stepped blades which cause fracturing of the heavy stainless steel shroud into pieces of unpredictable size when used with LMFBR fuel assemblies. Fracturing of the wrapper or shroud during shearing can present a problem in feeding the fuel assembly to the shear, since uncontained fuel pin fragments may hamper operation of the gag compactor.

Experiments, using porcelain filler as simulated fuel, have demonstrated that the size fractions of simulated fuel produced during the shearing operation will be about the same regardless of the prior art blade design used. When embrittled subassemblies are sheared using prior art stepped shear blades as described above, approximately 60% of the fuel is released as fines. This can cause mudding during subsequent dissolution of the fuel which tends to result in acid deficiency and is also know to result in solidification of the fines into lumps which are resistant to further dissolution.

It is, accordingly, an ojbect of the invention to provide a method for shearing spent fuel assemblies which yields uniform sheared segments.

Another object of the invention is to provide a method for shearing shrouded pin-type fuel assemblies wherein breakage of the shroud is minimized.

Still another object of the invention is to provide a method for shearing shrouded pin-type fuel assemblies wherein the sheared ends of the fuel pins within the sheared segments remain open to facilitate subsequent contact of the fuel contained therein with a dissolvent.

Another object of the invention is to shear shrouded fuel assemblies so that the sheared fuel pin and shroud segments remain intact as a discreet slice.

Another object of the invention is to provide a method for shearing shrouded pin-type fuel assemblies whereby substantially less fuel fines are produced during the shearing operation.

Other objects of the invention will be apparent upon examination of the following written description of a preferred embodiment of the invention and the accompanying drawings.

SUMMARY OF THE INVENTION

A method for shearing spent reactor fuel assemblies of the shrouded pin-type into short segments for the purpose of subsequent recovery of the fuel values therefrom are provided. The method includes compressing the fuel assembly to a reduced cross section whereby sufficient retaining forces are exerted upon the fuel pins in the compressed portion of the fuel assembly to prevent forward movement of the pins during subsequent shearing and then shearing segments from the compressed end of the fuel assembly with a shear blade having a shearing face contoured to match the contour of the cross section of the compressed fuel assembly which it engages.

DESCRIPTION OF THE PREFERRED EMBODIMENT

Figure 1:
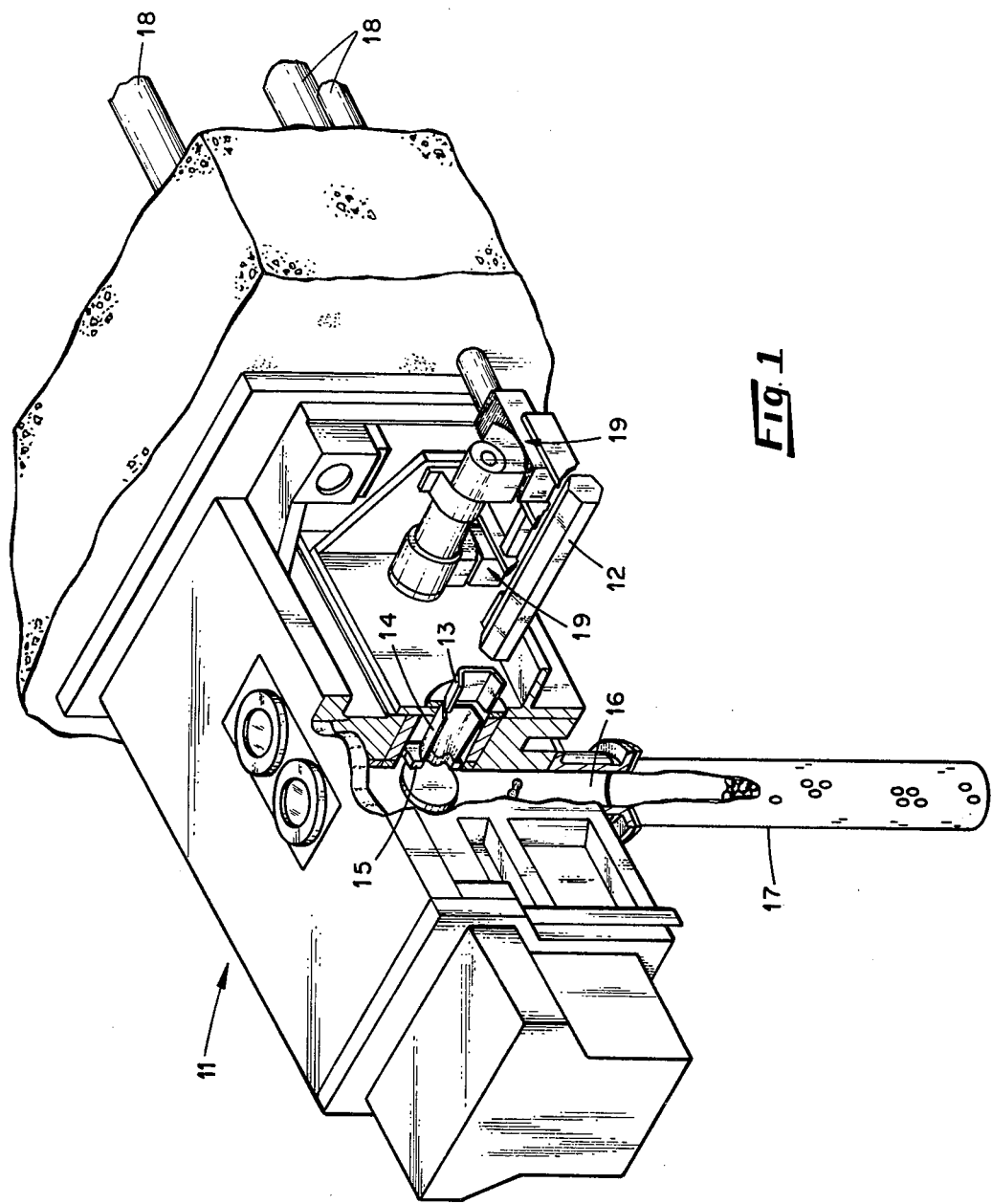
FIG. 1 is a perspective view, partially cut away, of a shearing apparatus utilizing gag compactors and a shearing blade made in accordance with the invention.

Turning now to the drawings, initially to FIG. 1, a fuel assembly shear apparatus 11 is shown receiving a fuel assembly 12 of the shrouded pin-type used in the LMFBR for the purpose of shearing the assembly into segments suitable for dissolution. As shown, the fuel assembly is inserted through a suitable port 13, compressed through the action of suitable gags 14 (only one shonw) and then cut into short segments of predetermined length using a moving shear blade 15. Gags 14 and shear blade 15 will be described in greater detail in later reference to FIGS. 7 through 13. The sheared segments of the fuel assembly drop through vertical passageway 16 into a perforated basket 17 positioned below the shear apparatus for subsequent chemical processing including leaching of nuclear fuel values from the fuel cladding, spacers and shroud segments. Rods 18 drive rack and pinion assemblies 19 which, in turn, drive gags 14 and moving shear blade 15 to accomplish the above described compacting and shearing operations. Alternatively, other arrangements such as a hydraulically actuated piston and cylinder could be used to provide the driving force for the gags and shear blades made in accordance with the invention. Also, the gags and shear blades could be oriented to travel in the vertical rather than the horizontal direction without departing from the scope of the invention.

Figure 2:
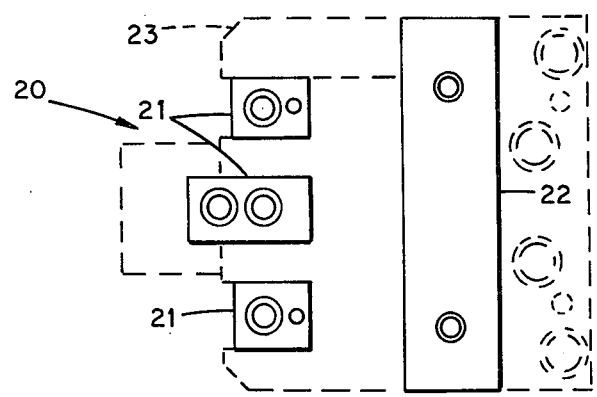
FIGS. 2–4 are plan views of prior art stepped shearing blades.

FIGS. 2-5 show several common prior art shear blades which are respectively identified as segmented, sharks-tooth and elongated blades. The segmented blade 20 of FIG. 2 is constructed to provide horizontally spaced blades 21 to pierce partially through the fuel assembly prior to completion of the shearing action by continuous straight blade 22. Blades 21 and 22 are supported by means of a suitable mounting plate 23 as shown in phantom in FIG. 2. The sharks-tooth blade 24 is provided with a stepped 45° cutting face 25 across its entire width and the elongated blade 26 has an elongated central section 27 which pierces completely through the fuel assembly before the remaining steps 28 on each side of the central section engage the assembly to complete the shearing.

Figure 3:
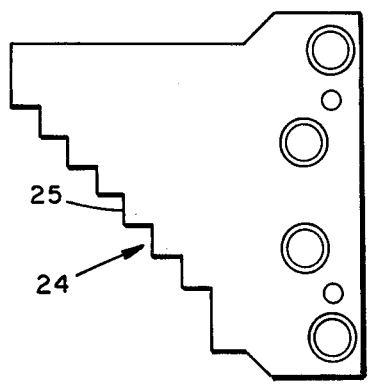
Figure 4:
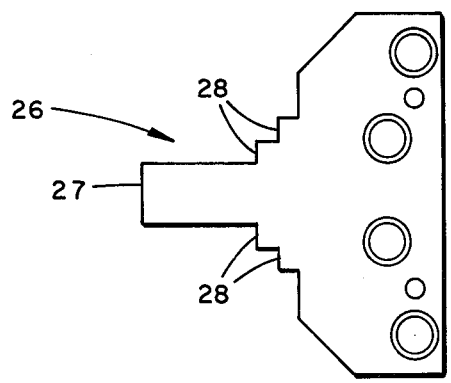

With all of the prior art shear blades shown in FIGS. 2-4 fracturing of the stainless steel shroud into pieces of unpredictable size occurs; particularly when the fuel assembly has been embrittled. This fracturing of the shroud prior to shearing may present a problem in feeding the assemblies to the shear blade since uncontained fragments of the assembly may hamper operation of the gag compactors.

It has also been found that when embrittled fuel assemblies are sheared using shear blades such as the prior art blades shown in FIGS. 2-4, approximately 60% of the fuel is released as fines. This can cause mudding during subsequent chemical dissolution of the fuel which tends to cause acid deficiency in the dissolution process, and may also result in the formation of lumps which resist dissolution.

Figure 7:
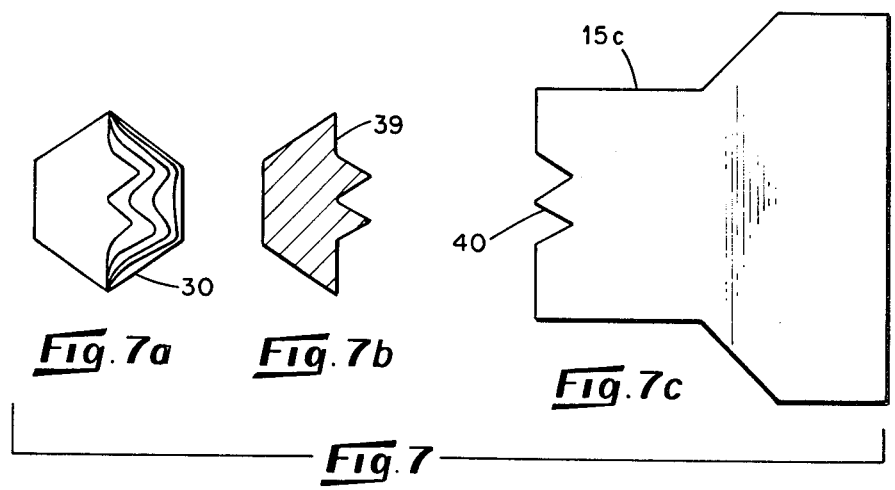
FIGS. 7a, 7b, and 7c illustrate the stepwise compaction of a fuel assembly having a hexagonal cross section into an M-shaped compact retaining half the original cross section of the fuel assembly and a shear blade made in accordance with the invention for shearing such compact.
Figure 5:
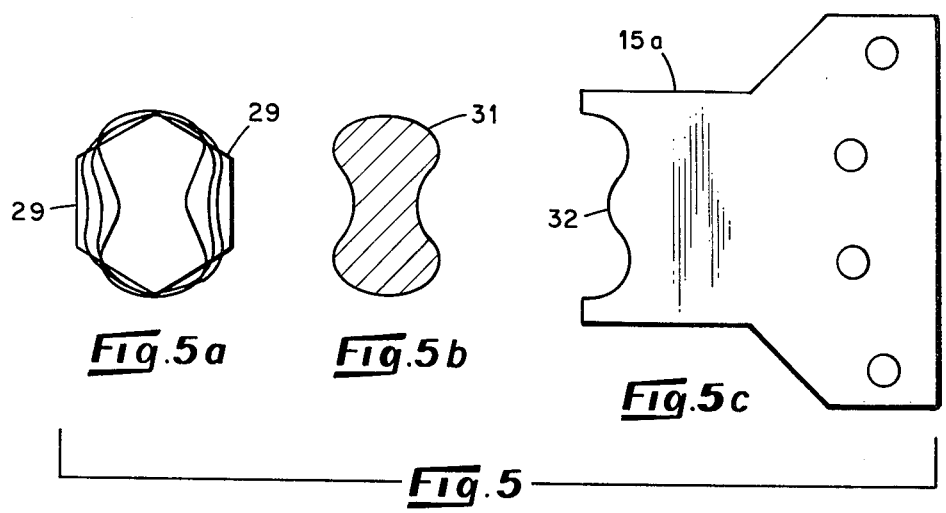
FIGS. 5a, 5b, and 5c illustrate the progressive compacting of a hexagonal cross section fuel assembly into a double gull-wing compact and a shearing blade made in accordance with the invention for shearing double gull-wing compacts.
Figure 6:
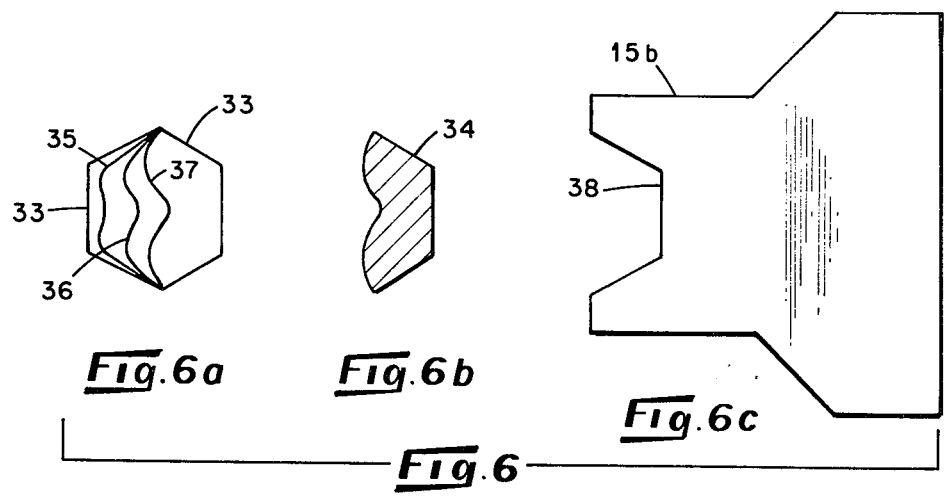
FIGS. 6a, 6b, and 6c illustrate the stepwise compaction of a hexagonal cross section fuel assembly into a single gull-wing compact retaining half the original contour of the fuel assembly and a shear blade made in accordance with the invention for shearing the compact.

FIGS. 5-7 illustrate the stepwise pressing of a LMFBR type fuel assembly into compacts suitable for shearing and shear blade designs made in accordance with the invention which shear the compacts in a much more uniform manner with considerably less fines than possible using prior art stepped shear blades. As shown in FIG. 5a, the original hexagonal cross section 29 of the fuel assembly is progressively deformed through the action of stationary and movable gags as described later in reference to FIGS. 8-13, until the assembly is transformed into a compact 31 as shown in FIG. 5b having a total cross sectional area which is about 50% of the original cross sectional area 29 of the fuel assembly. As shown in FIG. 5c, shear blade 15a is provided with a gull-wing contour at its leading or shearing face 32 which matches the contour of one side of compact 31 as shown in FIG. 5b. It has been found that by matching the contour of the shearing face 32 to that of the compact rather than utilizing the stepped shearing face configurations shown in FIGS. 2-4, it is possible to shear much more uniform segments from the compacted end of the fuel assembly with a substantial decrease in the percentage of fines which previously resulted from the shearing operation.

FIGS. 6 show an alternative scheme for compressing a hexagonal cross section fuel assembly 33 into a compact 34 which retains one half the original hexagonal shape of the fuel assembly with the other half deformed into a gull-wing shape. In the particular embodiment illustrated in FIGS. 6a and 6b, the movable gag retained the original hexagonal shape of the fuel element and drives the fuel element against a stationary gag having a gull-wing shape to provide a compact cross section as shown in FIG. 6b. The transformation from the original hexagonal to the compact shape shown in FIG. 6b takes place in an incremental manner as illustrated by lines 35, 36 and 37 in FIG. 6a. Shearing blade 15b of FIG. 6c has its leading or shearing face contoured to match the semi-hexagonal face of the compact 34 shown in FIG. 6b. Alternatively, the contours of the stationary and movable gags used to compress the fuel assembly of FIG. 6a could be reversed so that the gull-wing shaped contour would be engaged by the moving shear blade. In that case the shearing face 38 of the shear blade would be contoured to match the gull-wing shaped surface of compact 34.

FIG. 7 illustrate yet another embodiment where the fuel assembly having an original hexagonal cross section 30 is deformed progressively until it is compressed into a compact 39 having an M-shaped face as shown in FIG. 7b. In that case, the shearing face 40 of shearing blade 15c is contoured with an M-shaped depression to match the M-shaped face of the compact. Alternatively, the stationary and movable gags used to form the compact of FIG. 7b could be reversed leaving the original semi-hexagonal surface of the compact facing the shear blade which would then be contoured in the manner shown in FIG. 6c to match the semi-hexagonal surface of the compact.

Figure 9:
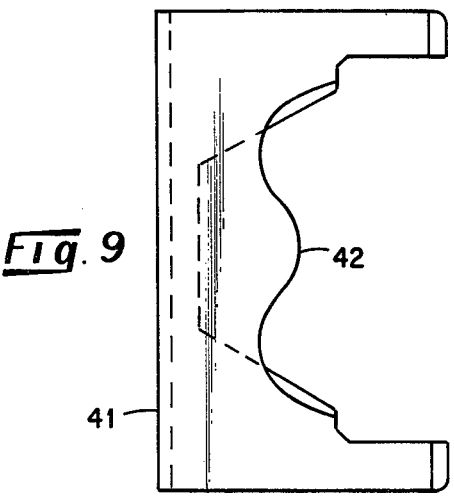
FIGS. 8-10 are side and end views of the stationary gag compactor portion used to transform a hexagonal cross section fuel assembly into a double gull-wing or dogbone shaped compact as shown in FIG. 5b.
Figure 12:
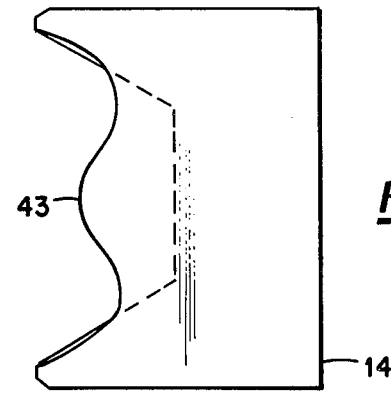
FIGS. 11-13 are side and end views of a movable gag compactor portion used in conjunction with the stationary gag compactor portion of FIGS. 8-10 to produce double gull-wing compacts as shown in FIG. 5b from hexagonal cross section fuel assemblies.
Figure 8:
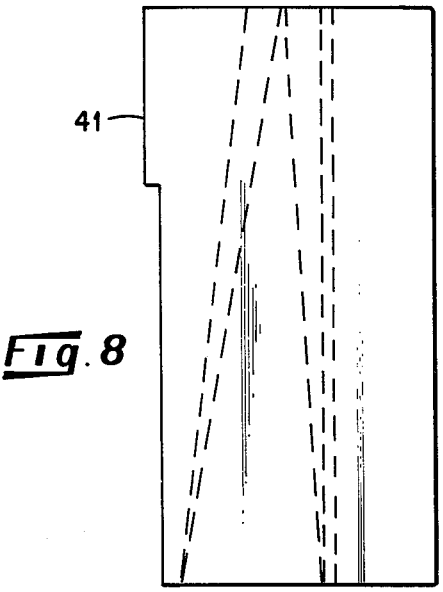
Figure 11:
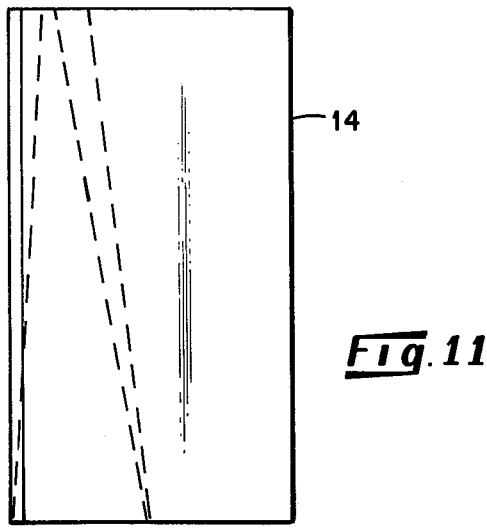
Figure 10:
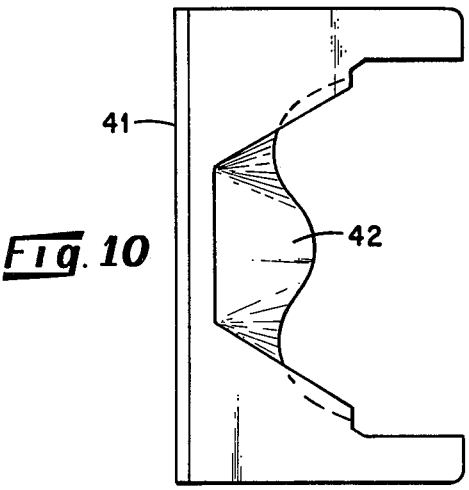
Figure 13:
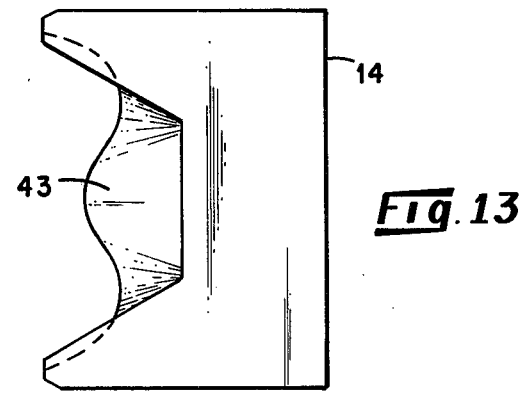

FIGS. 8, 9 and 10 are side and end views of a stationary gag 41, which, when utilized together with the movable gag 14 illustrated in the side and end views of FIGS. 11, 12 and 13, compresses a fuel assembly having a hexagonal cross section into a compact of reduced volume having a dogbone or double gull-wing shape as shown in FIG. 5b. The gags are respectively provided with pressing surfaces 42 and 43 which undergo a transition from a hexagonal opening corresponding to the original fuel assembly cross section at the one end as shown in FIGS. 10 and 13 to a double gull-wing shape corresponding to the compact cross section of FIG. 5b at the other end as shown in FIGS. 8 and 12. A gradual transition from a hexagonal to a double gull-wing shape occurs at increasing distances from the end of the gags shown in FIGS. 10 and 13 so that as the fuel assembly is advanced through the gags it is deformed from its original hexagonal cross section into the double gull-wing cross section. With the shearing apparatus set to shear one inch slices or segments off of the compacted end of the fuel assembly, the stationary and movable gags will progressively engage and compress the fuel assembly as it advances between the gags in one inch increments. The size of the incremental advance can vary, of course, depending upon the requirements of the chemical dissolution process which follows shearing.

Figure 14:
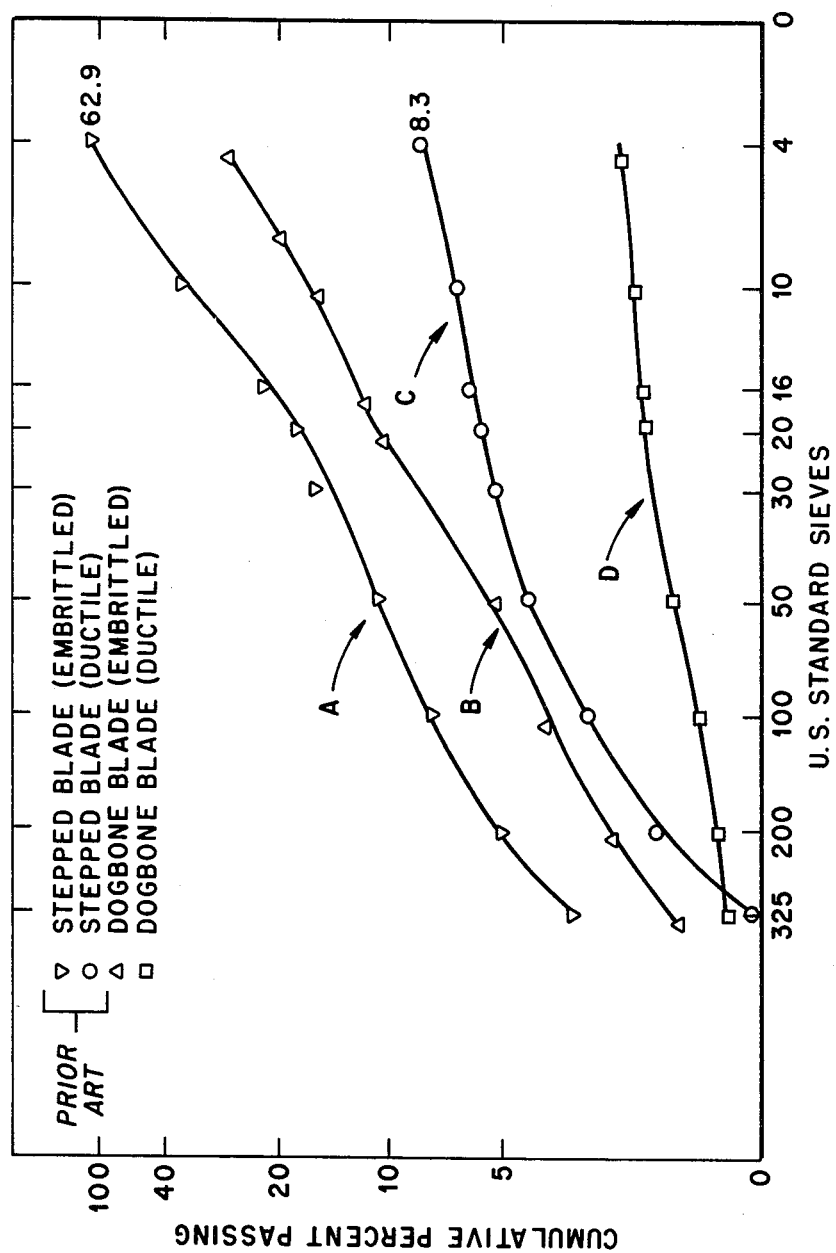
FIG. 14 is a graph showing the distribution of particle sizes which result from using prior art shearing blades and shearing blades made in accordance with the invention to shear ductile and embrittled simulated fuel asemblies of the LMFBR type.

FIG. 14 illustrates the reduction in fines achieved through use of the dogbone or double gull-wing compacts and a shear blade designed in accordance with the invention relative to the stepped blades of the prior art when shearing embrittled and ductile fuel assemblies. The graph shows the cumulative percent of particles passing through U.S. Standard Sieves for a stepped blade and for a blade similar to that illustrated in FIG. 5c designated the dogbone blade on the graph. As shown, curve "A" represents the range of fines produced using a prior art stepped blade to shear a simulated embrittled fuel assembly. That curve ranges from a low of about 4% particles passing through a 325 Standard Sieve to about 62.9% passing through a size 4 Standard Sieve. Curve "B", on the other hand, indicates the percentage of particles passing through the various sieve sizes where a dogbone shear blade is used to shear a simulated embrittled fuel element. Curve "B" ranges from a low of about 2% particles passing through a 325 Standard Sieve size to about 28% passing through a size 4 sieve. At both extremes and at various intermediate points, the percentage of fines produced by the dogbone blade is seen to be half or less of those produced by the prior art stepped blade. Curves "C" and "D" provide similar comparisons for stepped and dogbone blades shearing simulated ductile fuel assemblies. The stepped blade ranges from about 0% particles passing through a 325 sieve to about 8.3% passing through a size 4 sieve. Less than 1% of the particles produced by the dogbone blade pass through a size 325 mesh with 2-2% passing through a size 4 sieve. Thus, with the exception of the very finest sieve sizes, the dogbone or gull-wing blade produces only one half or less fines in shearing ductile fuel compared to prior art stepped blades. Both embrittled and ductile regions will be present in spent LMFBR fuel assemblies with the embrittled region being located in that part of the assembly located near the center of the core during operation in a LMFBR.

A significant advantage of the subject invention is the predictable and uniform nature of the sheared fuel segments that are produced. Individual slices of fuel assembly sheared according to the invention are characterized by all the fuel pins being open for dissolution of the fuel contained therein with spacing wires trapped between the fuel pins. The pins and spacing wires are held together by the shroud in a single bonded slice which makes the design of subsequent handling equipment less complicated. Previous methods and apparatus could not guarantee the results of the shearing operation. The shroud would tear and assume various shapes and the spacing wires and fuel pin segments would separate. In some instances, fuel pin segments would be inadvertently trapped in shroud material making it virtually impossible to mechanically separate those parts.

The above description of several preferred embodiments of the invention was provided for illustrative purposes only and should not be interpreted in a strictly limiting sense. For example, although the shearing blades and gag compactors were designed for processing shrouded fuel assemblies having a hexagonal cross section. the invention could be applied to the shearing of fuel assemblies having rectangular cross sections as well. It is intended rather that the invention be limited in scope only by the appended claims.

What is claimed is:

1. A method for shearing elongated spent nuclear fuel assemblies of the shrouded tube-bundle type into short segments for subsequent dissolution of contained fuel values comprising:

a. reducing the cross section of the fuel assembly by progressively pressing it between opposed movable and stationary gags defining a compression zone which progressively changes in cross section from that of the uncompressed fuel assembly to a cross section having a substantially reduced area relative to the cross section of the uncompressed fuel assembly which defines a non-planar contour for engagement by a shearing blade; said fuel assembly being advanced in a stepwise manner through said compression zone with said movable gag being periodically disengaged to permit such advancement and then engaged with said assembly in a compression stroke to compress said fuel assembly upon completion of said advancement; and b. shearing segments from the compressed end of said assembly by driving a shearing blade against said compressed end at a point immediately adjacent said compression zone while said movable gag is engaged with said assembly following completion of a compression stroke, said shearing blade having a non-planar shearing face contoured to match that portion of the contour of the compressed end of said fuel assembly which it engages.

2. The method of claim 1 wherein the cross section of said fuel assembly prior to compression is hexagonal, wherein said assembly is compressed by deforming three of its adjacent sides into a gull-wing shape and wherein said shearing blade is provided with a shearing face having a gull-wing shape adapted to engage and conform to the deformed sides of said fuel assembly.

3. The method of claim 1 wherein the cross section of said fuel assembly prior to compression is hexagonal, wherein said assembly is compressed by deforming three of its adjacent sides, and wherein said shearing blade is provided with a shearing face having a semi-hexagonal shape for engaging and conforming to the three remaining undeformed sides of said assembly.

4. The method of claim 1 wherein the cross section of said fuel assembly prior to its compression is hexagonal, wherein said assembly is compressed by deforming all six of its sides to form a symmetric compact with each symmetric surface of said assembly comprising a concave depression bounded by two convex surfaces and wherein said shearing blade is provided with a shearing face having a shape conforming to one of said symmetric faces.

5. The method of claim 1 wherein the cross section of said fuel assembly prior to its compression is hexagonal, wherein said assembly is compressed by deforming three of its adjacent sides to form an M-shape bounded by flat portions lying in a plane spanning the undeformed sides of said assembly and wherein said shearing blade is provided with a shearing face conforming to the deformed M-shaped sides of said fuel assembly.

* * * * *